W. A. SMITH.
ELECTRIC WELDER.
APPLICATION FILED JULY 19, 1915.

1,184,782.

Patented May 30, 1916.
2 SHEETS—SHEET 1.

Witnesses
E. R. Barrett
H. W. Kreinbring

Inventor
Wentworth A. Smith
By Paglsen and Spencer,
Attys.

W. A. SMITH.
ELECTRIC WELDER.
APPLICATION FILED JULY 19, 1915.

1,184,782.

Patented May 30, 1916.
2 SHEETS—SHEET 2.

Witnesses
E. R. Barrett
H. W. Kreinbring

Inventor
Wentworth A. Smith
by Pagelsen and Spencer
Atty's

UNITED STATES PATENT OFFICE.

WENTWORTH A. SMITH, OF WINDSOR, ONTARIO, CANADA, ASSIGNOR TO DETROIT ELECTRIC WELDER COMPANY, OF DETROIT, MICHIGAN, A CORPORATION OF MICHIGAN.

ELECTRIC WELDER.

1,184,782.　　　　　Specification of Letters Patent.　　Patented May 30, 1916.

Application filed July 19, 1915. Serial No. 40,652.

*To all whom it may concern:*

Be it known that I, WENTWORTH A. SMITH, a citizen of the Dominion of Canada, residing at Windsor, in the county of Essex and Province of Ontario, Canada, have invented a new and useful Electric Welder, of which the following is a specification.

This invention relates to adjustable supporting devices for chucks or work holders for electrical butt-welding machines, that is, machines for welding rods or bars of metal end-to-end, and its object is to provide a device by means of which the rods or bars to be welded may be quickly brought into correct alinement.

This invention consists, in an electric welder, in combination with a work holder, of a plurality of eccentrically mounted cylindrical supports therefor, and means for adjustably positioning the supports.

It also consists of a pair of eccentric sleeves, one within the other, under each side of one of the work holders of a welding machine, the planes passing through the centers of said eccentrics of each pair being normally at an angle to each other.

It further consists in the details of construction illustrated in the accompanying drawings and particularly pointed out in the claims.

Figure 2:
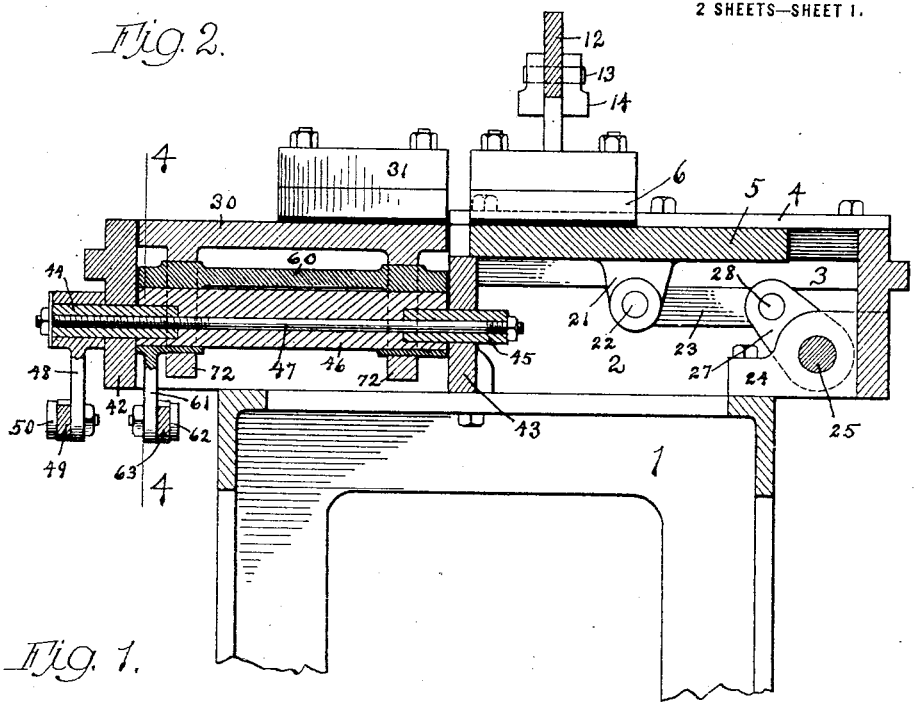
Figure 1:
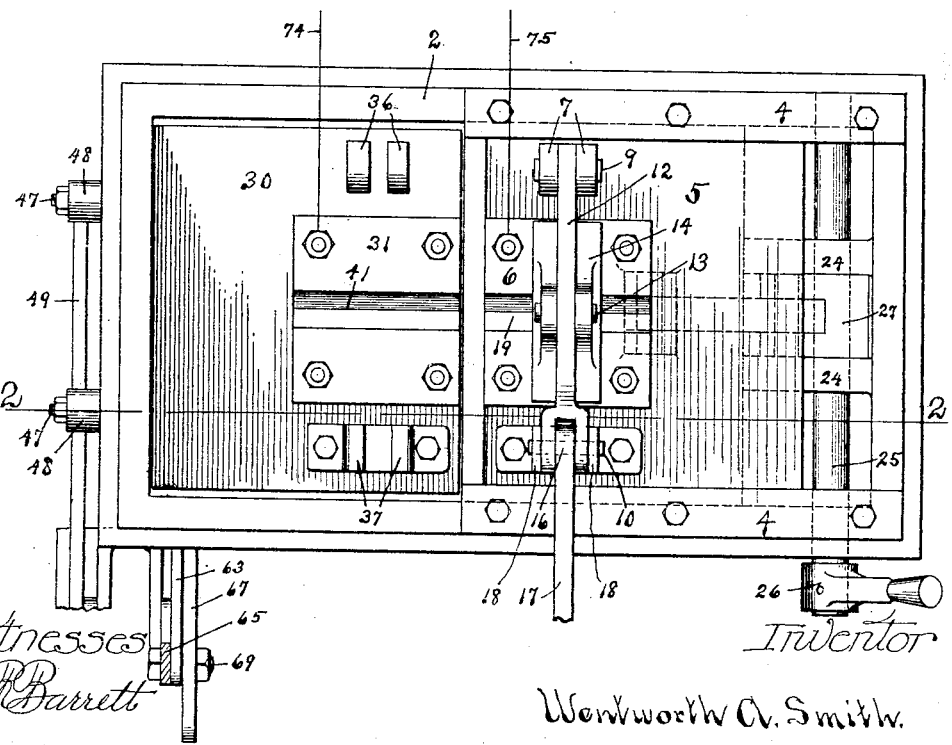
Figure 3:
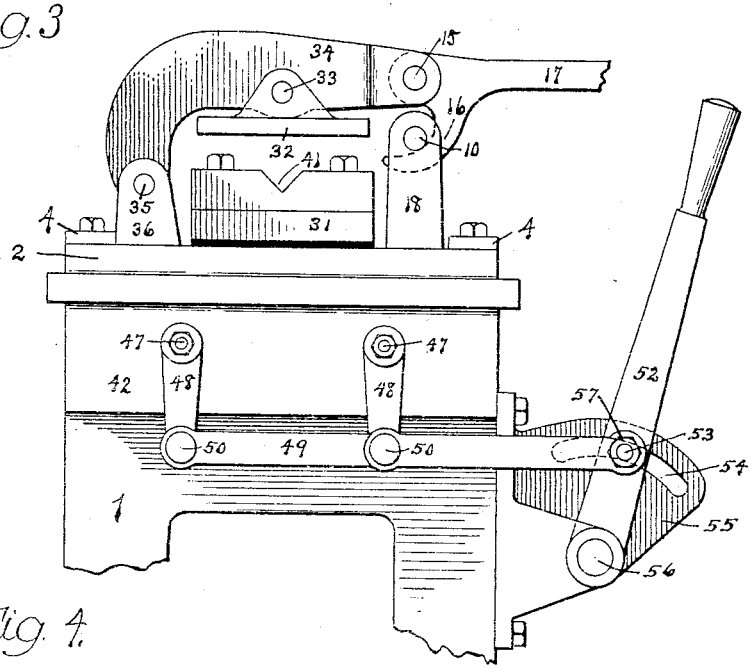
Figure 4:
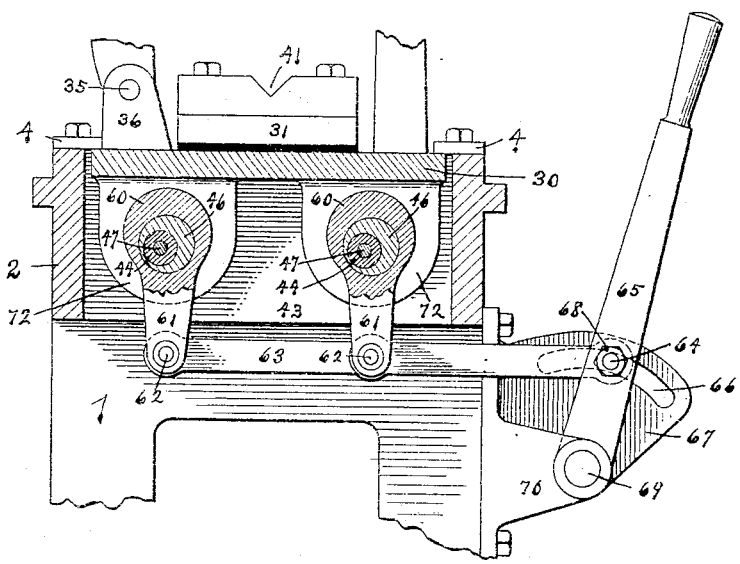

In the drawings, Figure 1 is a plan of the work table of an electric butt-welding machine. Fig. 2 is a section on the line 2—2 of Fig. 1. Fig. 3 is an elevation of the left end of the machine. Fig. 4 is a section on the line 4—4 of Fig. 2.

Similar reference characters refer to like parts throughout the several views.

The main frame 1 of the machine supports the table 2 provided with guides 3 and gibs 4, between which the plate 5 is slidable. This plate carries the lower member 6 of a chuck or work holder, the ears 7 through which the bolt 9 extends, and the uprights 18 which carry the pin 10. A lever 12 is pivoted at its rear end on the bolt 9 and carries a pin 13 intermediate its ends, on which pin the movable or top member 14 of the work holder or chuck is mounted. The front end of the lever may be forked and provided with a pin 15 on which a cam 16 having a handle 17 is mounted. See Fig. 3. Two uprights 18 support a pin 10 at their upper ends which may be engaged by the cam 16 in order to pull down the front end of the lever 12 and thus press down the upper member 14 of the chuck onto the work in the groove 19.

A pair of ears 21 (Fig. 2) extend down from the lower side of the plate 5 and carry a pin 22 on which one end of a link 23 is pivoted. Bearings 24 on the table 2 carry a shaft 25 on the front end of which is an operating handle 26 and on which also, intermediate its ends, is a crank 27 having a crank pin 28 to which the other end of the link 23 is connected. The operator can place one of the rods or bars to be united in the groove 19, swing down the handle 17 to bring the upper member 14 of the chuck onto said piece of work, and then move the work and chuck toward the other chuck by means of the operating handle 26.

The details of the parts thus far described form no part of the present invention and may be replaced by any other desired structures having similar functions.

A second chuck which is not movable longitudinally of the rods or bars to be welded is mounted on a plate 30, and consists of a bottom member 31 (Fig. 3), and top member 32 suspended on the pin 33 carried by the lever 34. This lever is pivoted on the pin 35 mounted in the ears 36 on the plate 30 and guided at its front end between the upper ends of the uprights 18 also on this plate. The lever and chuck member 32 may be depressed by means of a cam 16, mounted on the pin 15 and provided with a handle 17, all similar to the work holder previously described, if desired.

It is usually necessary that the rods or bars in the grooves 41 in the chuck member 31 shall be in perfect alinement with the rods or bars in the groove 19. This alinement may be obtained by providing means for raising and lowering the plate 30 and for moving it transversely in a substantially horizontal plane. To accomplish this the following described novel mechanism is provided. The table 2 is formed with an end bar 42 and intermediate cross bar 43. These bars are each provided with two holes, preferably evenly spaced, to receive the journal sleeves 44 and 45 which extend eccentrically into the cylinders 46, which cylinders thereby become eccentrics. Rods 47 extend through these journals and eccentrics and hold the crank arms 48 on the outer journals 44. Linkage 49 connects the pins 50 at the lower ends of these crank arms to the operating lever 52 by means of the bolt 53 which also passes through a slot 54 in the quadrant 55 on the main frame, the pin 56 acting as a fulcrum for the lever. By tightening the nut 57 on the bolt 53, the eccentrics 46 can be locked in any desired position.

Mounted on the inner eccentrics 46 are the outer eccentrics 60 (Fig. 4) from which the crank arms 61 extend downwardly and carry the pins 62 at their lower ends. Linkage 63 connects to these pins and to the bolt 64 extending through a hole in the lever 65 and the slot 66 in the quadrant 67, mounted on the frame 1. A nut 68 on this bolt 64 may be used to lock the lever 65 and eccentrics 60 in any desired position. The lever is pivoted on the pin 69 carried by the brackets 70. Extending down from the plate 30 are four ears 72, two for each eccentric 60, each constituting a bearing, in which these eccentrics are journaled. The mode of assembling this device and its operation are as follows.

The eccentrics 46 are slipped into the eccentrics 60 and these in turn are slipped into the holes in the ears 72 below the plate 30, and the whole device is lowered into place in the opening in the table 2. The journals 44 and 45 are then slipped through the bearing holes in the bars 42 and 43, the crank arms 48 are mounted on the journal 44 and the rods 47 are inserted to lock the journals in place in the eccentrics 46. The links are then connected to the crank arms 48 and 61 and to the levers 52 and 65, whereupon the device is in operating condition.

In Fig. 1 the outer eccentrics are shown to normally have their centers in vertical planes and the inner eccentrics 46 are shown to have theirs normally in a horizontal plane, but this is merely a matter of choice as they can be reversed or modified as desired. As the levers 52 and 65 have been swung out a few degrees, the eccentrics 46 and 60 have been turned to the left the same amount, the eccentrics 52 thereby raising the plate 30 and the chuck a short distance and the eccentrics 60 carrying the plate 30 about the same amount to the left. By shifting these levers the plate 30 and chuck can be shifted back and forth and lifted or lowered as the operator may desire. The operating levers may be at either the front or back of the machine and any other desired mechanism may be employed to actuate the supporting eccentrics. Any desired means may be employed to carry a heating current to the work holders, wires 74 and 75 being merely conventional.

I claim:—

1. In a butt-welding machine, the combination of a pair of work holders, a slidable plate to support one of the work holders, a second plate to support the second work holder, said second plate having downwardly extending ears, a pair of eccentrics journaled in said ears, supporting means for said eccentrics, and means to turn the eccentrics in said ears whereby the table may be shifted.

2. In a butt-welding machine, the combination of a table having an aperture, a plate positioned within the aperture and having two pairs of downwardly extending ears constituting bearings, a work engaging device on the plate, an eccentrically bored sleeve journaled in each pair of ears, an eccentrically bored cylinder in each of said sleeves, journals mounted in the ends of the inner eccentrics and in proper bearings in the table, and means to move the pairs of eccentrics to shift said plate.

3. In a butt-welding machine, the combination of a table having an aperture, a plate positioned within the aperture and having two pairs of downwardly extending ears constituting bearings, a work engaging device on the plate, an eccentrically bored sleeve journaled in each pair of ears, an eccentrically bored cylinder in each of said sleeves, journals mounted in the ends of the inner eccentrics and in proper bearings in the table, an arm connected to each eccentric, means connected to the arms on the inner eccentrics to move them within the outer eccentrics, and means connected to the arms on the outer eccentrics to move them within said ears.

4. In a butt-welding machine, the combination of a table having an aperture, a plate positioned within the aperture and having two pairs of downwardly extending ears constituting bearings, a work engaging device on the plate, an eccentrically bored sleeve journaled in each pair of ears, an eccentrically bored cylinder in each of said sleeves, journals mounted in the ends of the inner eccentrics and in proper bearings in the table, and means to move the pairs of eccentrics to shift said plate, the planes passing through the centers of said eccentrics being normally at an angle to each other.

5. In a butt-welding machine, the combination of a table having parallel cross bars each provided with two holes constituting bearings, journal sleeves mounted in the bearings, a pair of cylinders having their ends drilled off-center to receive said journal sleeves to constitute eccentrics, crank arms mounted on two of said journal sleeves whereby the eccentrics may be turned, means connected to said crank arms to cause them to move simultaneously, an outer eccentric sleeve mounted on each of said cylinders, a crank arm connected to each eccentric sleeve, means connected to said crank arms on the eccentric sleeves to cause them to move simultaneously, a work holder above the eccentrics, and projections on said work holder in such engagement with the eccentric sleeves that movement of the cylinders or eccentric sleeves will cause transverse movement of the work holder.

In testimony whereof I sign this specification in the presence of two subscribing witnesses.

WENTWORTH A. SMITH.

Witnesses:
HUGO W. KREINBRING,
EDWARD N. PAGELSEN.

Copies of this patent may be obtained for five cents each, by addressing the "Commissioner of Patents, Washington, D. C."